Figures 1, 2, 3:
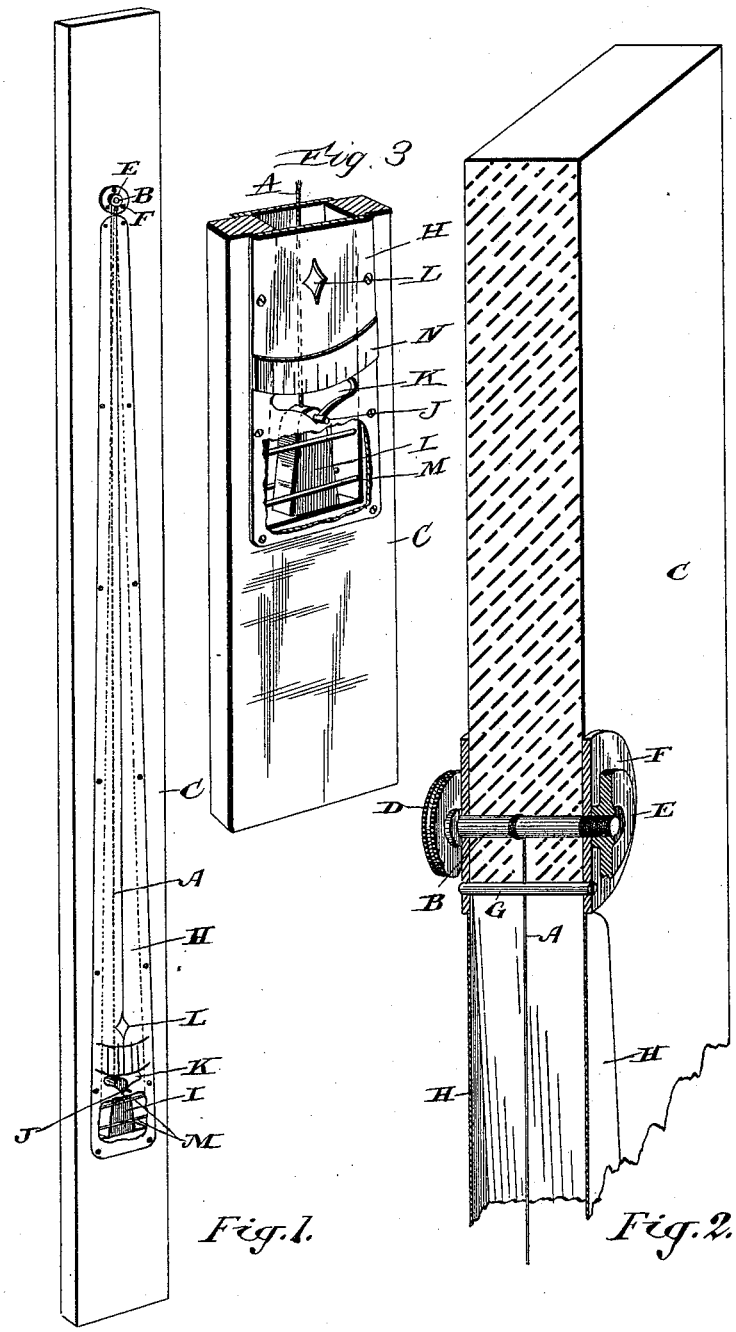

(No Model.)

W. J. WORKMAN.
BUILDER'S PLUMB.

No. 433,842. Patented Aug. 5, 1890.

Witnesses.
F. B. Featherstonhaugh.
H. G. McMillan

Inventor.
Wm. J. Workman
by Donald C. Ridout & Co
Attys

UNITED STATES PATENT OFFICE.

WILLIAM J. WORKMAN, OF TORONTO, CANADA.

BUILDER'S PLUMB.

SPECIFICATION forming part of Letters Patent No. 433,842, dated August 5, 1890.

Application filed September 30, 1889. Serial No. 325,569. (No model.)

*To all whom it may concern:*

Be it known that I, WILLIAM JOHN WORKMAN, builder, of the city of Toronto, in the county of York, in the Province of Ontario, Canada, have invented a certain new and Improved Builder's Plumb, of which the following is a specification.

The principal object of the invention is to design a builder's plumb which may be used in exposed positions without being affected by the wind; and it consists, essentially, of a plumb-line suspended from a spindle journaled in the plumb-board above a longitudinal recess in which the plumb-bob is suspended, plates or sides being placed on either side of the recess, so as to protect both the plumb-bob and plumb-line from the wind, a small hole or holes being formed in the plates or sides to expose sufficient of the plumb-line to indicate the position of the plumb.

Figure 1 is a perspective view of my improved builder's plumb. Fig. 2 is an enlarged sectional detail showing the plumb-line with its spindle and guide. Fig. 3 represents a detail view of a part of my invention.

A is the plumb-line, which is connected at its upper end to the spindle B. This spindle is suitably journaled in the plumb-board C, and has a knob D fixed to one end, its other end being screwed to receive the nut E, which when screwed against the washer F prevents the spindle being turned. In order to hold the plumb-line A in the center, I fix immediately below the spindle B a bar G, through a hole in which I pass the plumb-line A, as indicated.

It will be noticed that the plumb-board C is cut out or recessed and that on either side of the said opening or recess is screwed or otherwise fixed a plate H, forming a boxed recess, which effectually protects the plumb-line A and plumb-bob I, which is suspended from the bottom of the plumb-line A. From the center of the plumb-bob I a pin J projects and extends through a hole K, made in the plate H. Slightly above the hole K, I make a diamond-shaped hole L, through which the plumb-line A may be seen.

When the plumb is not in use, I let out the plumb-line A, as shown in the drawings, until the plumb-bob rests on the bottom of the recess. In this way the plumb-line A is relieved of all strain, except when in actual use.

I prefer to make the plumb-line A of copper wire; but of course I do not wish to confine myself to any particular material.

A center line is made on the face of the plate H, which center line extends from the center of the spindle B through the centers of the holes K and L.

When the plumb is to be used, the knob D is seized and the spindle B caused to revolve so as to wind the plumb-line A around it sufficiently to raise the plumb-bob I clear of the bottom of the recess and bring the pin J substantially in the center of the hole K, and as this pin is exactly on a line with the plumb-line A the position of the plumb-line is indicated by the position of the pin J.

I should have mentioned that when the plumb-line A has been wound upon the spindle B the nut E is tightened, so as to prevent the said spindle from revolving.

In order to prevent the plumb-bob I coming in contact with the side plates H, I place on each side plate a spring-finger M, against which the plumb-bob I will strike should the plumb-board C be held out of plumb. Of course when in use the plumb-board C must be held in a perfectly vertical position; but should there be any inaccuracy the plumb-bob will strike against the fingers M and will regain its position more quickly than if it were permitted to rub against the side plates.

In order to enable work to be plumbed at any angle desired, I place above or below the hole K a graduated limb or angle-plate N, so that the angle of the work may be set at once.

What I claim as my invention is—

1. A builder's plumb consisting of the recessed plumb-board, plates secured to the board on each side of the recess, one plate having a sight-opening and opening for the pin of the plumb-bob, the spindle having a binding-nut thereon, the guide below the spindle, the cord carrying the plumb-bob and connected to the spindle, and fingers or guides adjacent to the bob for guiding the same.

2. A builder's plumb consisting of a recessed plumb-board, plates secured to the board on each side of the recess, one having a sight-opening and a hole for the pin of the plumb-bob, the spindle having a binding-nut thereon, the guide below the spindle, the cord carrying the plumb-bob and connected to the spindle, and the graduated plate above the hole of the plate.

3. A builder's plumb consisting of a recessed plumb-board, plates on each side of the board, one having an opening for the pin of the bob, the spindle having a binding-nut thereon, the cord carrying the bob and connected to the spindle, and the graduated plate.

Toronto, August 31, 1889.

WILLIAM J. WORKMAN.

In presence of—
  CHARLES C. BALDWIN,
  F. R. CAMERON.